United States Patent

Hunsicker

[15] 3,663,216

[45] May 16, 1972

[54] ALUMINUM ELECTRICAL CONDUCTOR

[72] Inventor: Harold Y. Hunsicker, Lower Burrell, Pa.

[73] Assignee: Aluminum Company of America, Pittsburgh, Pa.

[22] Filed: Aug. 10, 1970

[21] Appl. No.: 62,633

Related U.S. Application Data

[63] Continuation-in-part of Ser. No. 889,314, Dec. 30, 1969, abandoned.

[52] U.S. Cl. ..........................75/142, 148/11.5 A, 148/12.7, 148/32.5, 148/159
[51] Int. Cl. .......................................C22c 21/00, C22f 1/04
[58] Field of Search ....................... 148/11.5, 12.7, 32.5, 159; 75/142, 147

[56] References Cited

UNITED STATES PATENTS 1,704,253   3/1929   Hybinette .............................. 148/12.7
2,572,562   10/1951  Harrington ........................... 148/159

OTHER PUBLICATIONS

Metal Progress; " Cond–Al" – Tailor–Made Aluminum Alloy of High Creep Strength and Conductivity; Harrington et al., May 1953, pp. 90– 93

*Primary Examiner*—L. Dewayne Rutledge
*Assistant Examiner*—W. W. Stallard
*Attorney*—Carl R. Lippert

[57] ABSTRACT

Aluminum conductor containing 0.25 to 0.5% Cu and 0.05 to 0.20% Mg and having good tensile strength and a minimum electrical conductivity of 60 percent IACS together with good bendability and improved connector conduction stability. A preferred fabrication method contemplates working at temperatures that retain the Cu and Mg is solid solution but also impart strain hardening, a drastic cold reduction to produce a severely strain hardened conductor product followed by a controlled thermal treatment to relax a certain amount of the strain and precipitate a portion of the Cu and Mg.

7 Claims, No Drawings

ALUMINUM ELECTRICAL CONDUCTOR

This application is a continuation-in-part of application Ser. No. 889,314, filed Dec. 30, 1969 now abandoned

BACKGROUND OF THE INVENTION

The invention relates to an aluminum base alloy particularly suited for producing electrical conductor wire and to a method of producing the wire and to the wire product.

Electrical conductor wire, insulated or uninsulated, is employed in the building industry including homes and office buildings and in other applications. Copper is normally employed as the conductor in this wire although aluminum offers cost advantages and, accordingly, would be quite useful if it could satisfy certain requirements. Aluminum wire to be suitable should have very high electrical conductivity along with good mechanical properties. A minimum tensile strength of 20 ksi is required in some cases in order to withstand the loads imposed during handling and use including installation of the wire in buildings where insulated wires and cables are pulled through conduits and the like. The yield strength, 0.2 percent offset, in these cases preferably should be at least 15 ksi to avoid plastic deformation and thinning of the wire during installation. In addition, the wire should have sufficient ductility, desirably about 3 percent or preferably higher, elongation in 10 inches. Some applications are less critical with respect to strength although good performance in conductivity and in the other characteristics now described is always desired. Another important characteristic, related somewhat to ductility, is bendability which is the ability of the wire to be bent in a short radius. Bendability is important to permit twisting the wire about its own diameter for making splices and connections, to avoid breakage which might otherwise occur as a result of kinking and to facilitate installation with screw type connectors. High stability of electrical conductance of connections and terminations is another essential requirement for building wire.

One aluminum material employed for conductor wire is in a substantially pure aluminum metal containing at least 99.45 percent aluminum and normally referred to as EC wire. While EC wire exhibits very good electrical conductivity, up to 62 percent of the International Annealed Copper Standard, IACS, and sometimes higher, it does not exhibit the desired combination of strength, elongation, bendability and connection conductance stability. In the extra hard temper, often designated the H19 temper, EC possesses enough strength but is severely limited in elongation and bendability. Annealing the wire cures the ductility shortcoming but reduces the strength excessively. Various aluminum alloys, in addition to EC metal, have been proposed but are marked by disadvantages, some in electrical conductivity and others in strength or an unacceptable economic picture. For instance, aluminum alloy 6201 containing magnesium and silicon is readily capable of meeting the strength requirements and exhibits higher elongation than EC-H19 metal but requires uneconomical solution and precipitation heat treatments and cannot be relied upon to achieve an electrical conductivity much over 53 percent IACS.

DESCRIPTION

In accordance with the invention, an aluminum conductor is provided which satisfies all the requirements outlined above. The conductor is fashioned from an alloy consisting essentially of 0.25 to 0.5 copper and 0.05 to 0.20 percent magnesium, the balance being essentially aluminum with the following maximum limits on other elements and impurities: 0.10% Si, 0.25% Fe, 0.04% B, 0.05% Ga, 0.05% Zn, 0.01% Sn, 0.01% Ni, 0.005% Mn, 0.005% Cr, 0.005% Ti, 0.005% V and 0.005% Zr. In addition, the total of all elements other than Al, Cu and Mg should not exceed 0.4 percent. It is preferable that the sum of percentages of Cu plus Mg equal at least 0.4 percent. The percentages are by weight. This alloy has the ability to be fabricated into electrical conductor which will exhibit the required electrical properties.

The aluminum conductor metal is first provided as a melt. If excessive amounts of vanadium or titanium are present, the melt may, prior to making any alloy additions, be treated by adding boron to precipitate these elements. The melt is cast into an ingot which may be produced by continuously casting. The size of the ingot is not especially important although an ingot approximately 6 inches square in cross section is satisfactory.

The ingot is typically heated to a relatively high temperature and held there for a time sufficient to assure that the soluble elements are homogeneously distributed in solution throughout the ingot. The temperature may vary somewhat but should be at least 620° F. A typical treatment would be ½ to 4 hours at 650° to 750° F. for an ingot six inches square in cross section.

The homogenized ingot can be fabricated into an intermediate rod product from which the final conductor product is drawn or otherwise worked. Suitable metal working operations include rolling with contoured rolls to produce a rod of circular cross section usually having a diameter of about three-eighths or seven-sixteenths inch. During these working operations, according to the preferred practice where the conductor product desired strength level is 20 ksi tensile and 15 ksi yield, the metal working temperature is controlled such that some amount of strain hardening is imparted to the rod while retaining essentially all the Cu and Mg in solid solution. The amount of strain hardening should be equivalent to that derived from a cold reduction in cross sectional area of from 15 to 30 percent based on the rod size. Quite suitably, the amount of strain hardening may be equivalent to that which would be derived from a 20 percent cross sectional cold reduction. This may be accomplished by initially breaking down the ingot at a relatively high temperature of about 700° F. At some point, for instance, when the 6 inch square ingot has been reduced to about 2 inches, the metal temperature is lowered to about 575° to 600° F. by application of cooling and lubricating fluids in the rolling operation. When the metal has been further reduced, for instance, to a polygonal cross section of about 1 inch across its faces, the temperature is reduced to about 450° to 500° F. and rolled to the final rod size at temperatures which are not permitted to rise above 450° F. The foregoing cycle is presented in a strictly illustrative sense. Various manipulations of temperature and the extent of working at a temperature will produce substantially the same effect in strain hardening and the invention is not limited to any exact schedule. It is, however, significant that the rod include the prescribed amount of strain hardening and that the Cu and Mg be retained in solid solution. With respect to the latter, metal working temperatures around 400° to 600° F. are best avoided except for brief exposures not exceeding a few minutes. For the three-eighths or seven-sixteenths inch rod, the tensile and yield strength levels for a strain hardening effect equivalent to a 20 percent cold reduction are, respectively, about 20 and 15 ksi.

The rod can be cold worked to produce the conductor product which, in the case of wire, often ranges from 0.010 inch to 0.182 inch across its cross section. Since drawing is the working operation normally employed, the rod is often designated redraw rod. In drawing, the rod is pulled through a succession of dies having openings of gradually diminishing size. This cold drawing imparts to the wire a severely strain hardened temper condition. The extent of the strain hardening in the wire should be that amount equivalent to a cold reduction in cross sectional area of at least 75 percent, and preferably at least 90 percent. In the preferred practice no annealing steps should be performed in connection with the drawing operation as such would soften or relieve the strain hardening effect which is desired at this point in the fabrication sequence. It is permissible to anneal at some intermediate stage in drawing wire of the smaller sizes, less than 0.045 inch, provided that the equivalent cold reduction in area after annealing is at least 90 percent.

Preferably the conductor produced by the preferred practice just described and in the severely strain hardened temper is heated to a temperature of from 400° to 500° F. for 15 to 500 minutes, time being related to temperature in a generally inverse manner. This results in a controlled partial relaxation of the strain hardened condition and a partial precipitation of the copper and magnesium. The net result is an increase in elongation and bendability with some decrease in strength together with a significant increase in electrical conductivity. The resulting wire consistently exhibits minimum tensile and yield strength levels of 20 ksi and 15 ksi, respectively, together with a minimum elongation of 3 percent in 10 inches and a minimum electrical conductivity of 60 percent IACS. While this thermal treatment and the preferred fabrication practice result in properties which are optimum for many applications, the invention, as explained further hereinafter, also contemplates a more complete anneal and varying the fabrication process which results in lower mechanical properties which are nonetheless quite useful.

A characteristic of great importance with respect to aluminum wire is its capability for being bent and wrapped about screw type connectors and terminals provided on switch and junction boxes, receptacles, fixtures and the like. The wire must not only readily form a bend once, but must be capable of being removed, straightened and rebent without fracturing. EC wire in the severely strain hardened temper or even in some of the softer tempers is difficult to bend initially and frequently breaks if straightened and rebent. Wire according to the invention can be bent several times without breaking and meets the practical requirements for this property.

In order to demonstrate the advantages of the invention, the following illustrative examples proceed.

EXAMPLE 1

Wire of the improved aluminum base alloy and containing 0.40% Cu and 0.14% Mg was fabricated in accordance with the preferred practice. In addition to Al, Cu and Mg, the alloy contained the following impurities: 0.2% Fe, 0.05% Si, 0.002% Mn, 0.004% Ni, 0.002% Ti, 0.001% V, 0.002% Sn, 0.021% B and 0.018% Ga. Ingots having a 6 inch square cross section were continuously cast and were smooth enough to be rolled in the as cast condition without any scalping or machining. The ingots were hot and continuously rolled into a round rod three-eighths inch in diameter. During the continuous rolling phase, the metal temperature was controlled at levels ranging from a high of about 660° F. as the ingot entered the mill to a low level of about 400° F. as the rod exited the mill. The resulting condition of this rod was substantially the same as that which would result from a 20 percent cold reduction in cross sectional area. Its tensile strength was 20.6 ksi which corresponds quite well with a 20 percent cold reduced standard level of 20 ksi. This rod was then cold drawn into wire about 0.080 inch in diameter which wire was in the severely strain hardened temper as the cold reduction was over 95 percent in cross sectional area. Samples of the severely strain hardened wire were heated for different times at temperatures of 400° to 500° F. in accordance with the improved method. Tensile strength, yield strength, elongation and electrical conductivity measurements and bend tests were made for each condition including the initial severely strain hardened condition. Electrical conductivity measurements for intermediate time at temperature samples were not made since earlier tests established that the conductivity levels were always between those for the shortest and longest times at each treatment temperature. For example, the conductivity levels for the sample 6 and 7 specimens are between the conductivity levels for the sample 5 and 8 specimens. To ascertain the capability of the wire to sustain bending, straightening and rebending, a test method was employed in which the wire is bent 90° in a fixture which forms a bending radius equal to one half the diameter of the wire. The wire is then straightened and, if intact, bent 90° in a direction opposite to that of the first bend and restraightened. This procedure is repeated until the wire breaks. Each 90° bend followed by straightening is considered as one complete bend.

The results are listed in Table I, from which it can be seen that wire in accordance with the improved method, samples 2 through 11, exhibited more than adequate yield (Y.S.) and tensile (T.S.) strength levels and elongation together with the very good electrical conductivity levels, over 60 percent, and also very good bending characteristics. Wire in accordance with the improved method could be bent and straightened from four to six times before failure by breaking which correlates with greatly improved bendability for making connections. For comparison purposes measurements are listed for EC aluminum wire in the extra hard (H19) and annealed (0) tempers and for copper wire. It can be seen that the EC wire in the H19 temper exhibits good strength but falls short in elongation and bendability. The fully annealed temper reverses the situation and shows inadequate strength. EC wire in intermediate tempers, whether imparted by strain hardening less severe than the H19 temper or by partial annealing of H19 material all fail to satisfy the required combination of strength and bendability. It is significant that in the same type of bend test as employed here, copper wire can be bent about five times and the improved wire, samples 1 through 10, compares very favorably with this level of bendability. It is quite clear from Table I that, for the intended purpose, the samples in accordance with the preferred practice of the invention represent the best combination of electrical conductivity and mechanical properties in aluminum wire. The data of Table I also illustrate the general inverse relationship between time and temperature in the preferred final thermal treatment. For example, the treatment of 30 minutes at 450° F. produced strengths very similar to those produced by heating 8 hours at 400° F. A treatment of only 15 minutes at 500° F. caused slightly more softening than the treatment of 4 hours at 450° F.

TABLE I

| Sample No.: | Thermal treatment | | T.S. K s.i. | Y.S. K s.i. | Elong. percent in 10" | Elong. cond., percent IACS | Bends |
|---|---|---|---|---|---|---|---|
| | Time | Temperature, ° F. | | | | | |
| 1 | 2 hrs | 400 | 30.2 | 27.4 | 3.1 | 60.1 | 4 |
| 2 | 4 hrs | 400 | 28.7 | 26.0 | 2.9 | | 5 |
| 3 | 8 hrs | 400 | 27.2 | 24.0 | 3.0 | 60.8 | 6 |
| 4 | 30 min | 450 | 27.2 | 23.6 | 4.1 | 60.1 | 4 |
| 5 | 1 hr | 450 | 26.3 | 22.8 | 4.9 | | 4 |
| 6 | 2 hrs | 450 | 24.9 | 21.3 | 5.7 | | 5 |
| 7 | 4 hrs | 450 | 23.6 | 20.0 | 6.7 | 60.7 | 5 |
| 8 | 15 min | 500 | 23.3 | 18.9 | 7.3 | 60.2 | 6 |
| 9 | 30 min | 500 | 22.8 | 17.9 | 8.1 | | 5 |
| 10 | 1 hr | 500 | 22.0 | 16.0 | 11.0 | 60.5 | 5 |
| EC-H19 | None | None | 30.7 | 27.1 | 1.3 | 61.6 | 3 |
| EC-0 | 60 min | 780 | 14.2 | 8.4 | 25.2 | 62.4 | 6.5 |
| Copper | | | 37.6 | 24.0 | 30.8 | | 5 |

EXAMPLE 2

In order to demonstrate that various compositions within the range of Cu and Mg contents set forth for the improved alloy can be fabricated to produce wire having the desired mechanical and electrical characteristics, seven compositions were prepared and fabricated into wire in accordance with the procedure described in Example 1. The compositions for the alloys are listed in Table II along with tensile properties, electrical conductivity values and the results of bend tests. Table II clearly verifies that various combinations within the improved alloy composition can be fabricated into wire which exhibits mechanical and electrical properties conforming to the defined limits.

TABLE II

| Sample No.: | Cu | Mg | Thermal treatment Time, min. | Thermal treatment Temperature, °F. | T.S. K s.i. | Y.S. K s.i. | Elong. percent in 10" | Elong. cond., percent IACS | Number of bends |
|---|---|---|---|---|---|---|---|---|---|
| 11 | .46 | .09 | 30 | 450 | 26.0 | 22.3 | 4.8 | 60.4 | 4.5 |
| 12 | .46 | .09 | 30 | 500 | 22.8 | 16.0 | 8.2 | 60.4 | 5.5 |
| 13 | .34 | .09 | 30 | 450 | 25.8 | 21.7 | 4.6 | 60.7 | 4.5 |
| 14 | .34 | .09 | 30 | 500 | 22.3 | 17.6 | 8.4 | 61.0 | 5 |
| 15 | .40 | .14 | 30 | 450 | 27.3 | 24.2 | 4.6 | 60.1 | 4 |
| 16 | .40 | .14 | 30 | 500 | 23.4 | 18.6 | 8.2 | 60.4 | 5 |
| 17 | .32 | .13 | 30 | 450 | 26.8 | 21.9 | 4.0 | 60.4 | 4.5 |
| 18 | .32 | .13 | 30 | 500 | 23.1 | 18.2 | 7.1 | 60.6 | 5 |
| 19 | .28 | .16 | 30 | 450 | 26.7 | 23.9 | 4.8 | 60.3 | 4 |
| 20 | .28 | .16 | 30 | 500 | 23.0 | 18.2 | 7.8 | 60.6 | 5 |
| 21 | .26 | .20 | 30 | 450 | 27.2 | 23.3 | 4.5 | 60.0 | 4 |
| 22 | .26 | .20 | 30 | 500 | 23.1 | 17.7 | 7.3 | 60.3 | 5 |
| 23 | .44 | .10 | 30 | 450 | 26.3 | 22.5 | 4.6 | 60.3 | 4.5 |
| 24 | .44 | .10 | 30 | 500 | 23.5 | 19.2 | 7.8 | 60.4 | 5.5 |

A most important consideration in weighing the merit of a conductor wire material is the ability of the wire to maintain a stable electrical conductance in an electrical connection. The resistance should be stable and within acceptable limits. If the resistance tends to increase excessively with usage, potentially dangerous temperatures could be reached which, of course, would render a material unsuitable, or at least questionable. This is one problem which has plagued previous aluminum conductor wire, especially when compared to copper wire in connector configurations designed for copper wire. When EC aluminum wire is used in connectors designed primarily for copper wire, the resistance in the connections may increase by as much as 400 to over 1,000 percent and may overheat. Under the same conditions of installation and thermal cycling employing wire according to the invention, the resistance of the connections increases only 100 to 300 percent, or even less, which does not cause overheating in most connections. In order to demonstrate the marked superiority of the improved conductor wire the following example proceeds.

EXAMPLE 3

An ingot of another alloy of similar composition to that discussed in Example 1 and containing 0.41% Cu, 0.12% Mg, 0.14% Fe and 0.05% Si was rolled, and cold drawn to 12 gauge (0.080 inch diameter) wire in accordance with the preferred practice of the invention. After heating 30 minutes at 450° and 500° F. the properties of this wire were as shown in Table III which lists the tensile and yield strength, elongation and conductivity for each temperature condition.

TABLE III

| Condition | Treatment Temp. | T.S. ksi | Y.S. ksi | El. % in 10" | El. cond. % IACS |
|---|---|---|---|---|---|
| A | 450°F. | 25.7 | 23.0 | 5.0 | 60.4 |
| B | 500°F. | 22.0 | 17.7 | 8.8 | 60.4 |

Samples of each wire were connected to Pass and Seymour Inc. ground duplex convenience electrical outlets (Catalogue No. 6200 rated at 15 amps) so as to test their usefulness in a common household electrical connection normally used with copper wire but not especially suited for aluminum wire. The wires were inserted into openings in the back of the outlet and secured by a set screw type arrangement. Each connection was put through a certain test sequence and a number of contact resistance measurements taken at certain intervals. The contact resistance was recorded in terms of percent of the acceptance reference level (ARL). This is an arbitrary system wherein 100 percent represents that the connection resistance is equal to the resistance of a length of wire five times the wire diameter. A 100 percent ARL value represents a more or less ideal connection which is not really required in the building conductor field as connections showing ARL values up to about 400 percent are considered satisfactory if the connection has adequate heat dissipating characteristics. This system provides a highly useful tool for comparing one wire with another.

The test sequence proceeds as follows. The connection is made and the initial resistance recorded in terms of percent ARL. After this several specimens for each test are placed on a rack for oven cycling. At this point, while the specimens are on the rack, the first in place measurement is made. This value may vary from the initial level since the connection is mechanically disturbed in placing it on the rack. The rack containing the specimens is than placed in a heated oven for thermal cycling so as to simulate thermal cycle induced increases in connection resistance. The specimens are exposed to a number of oven cycles at a temperature of 70° C. In each cycle the rack containing the specimens is placed in the oven for a sufficient time for the connection to reach the oven temperature whereafter it is removed for a sufficient time to allow the connection to return to room temperature. Resistance measurements are taken after nine, 18 and 27 oven cycles. After completion of the thermal cycling tests current cycling tests are performed. In these tests the connections are wired by suitably joining the wires from one connection to another in series fashion. At this point a second in place reading is taken. The connections are then subjected to current cycling at current levels of 15 and 20 amps. In each current cycle the current is maintained for a sufficient time to allow the connection temperature to stabilize and then interrupted so that the connection can cool. Connection resistance is measured after 100, 250 and 500 current cycles (CC) at 15 amps and after 25 and 100 cycles at 20 amps. The foregoing test program provides a very useful evaluation of a conductor material in that it is subjected to the cumulative effects of conditions considerably more severe than those actually contemplated in use without the test being overly severe and needlessly under-rating materials which could perform well in actual service. A material which does well in these tests is considered quite acceptable for building conductor use. The results of the tests are set forth in Table IV which lists the data for the improved wire in both the "A" and "B" thermal treatment conditions described in Table III together with comparison tests for the best performing EC wires and for annealed copper wire. The EC wires were tested in the extra hard (H19) temper and in a partially annealed temper (H24) produced by heating H19 material to partially relax the strains, typically by heating to about 300° to 500° F. for ½ to 4 hours. In Table IV the initial level is in percent ARL whereas the other values designate the increase (percent ARL) over this initial level. Thus the percent ARL based on the measured resistance amounts to the indicated value plus the initial level value. The reason for listing the increase over the initial level is that a most important consideration is the stability of the connection; it is the consistency of the values which measures the stability of the connection.

From Table IV it is quite apparent that the EC wire, in either temper, exhibits a steadily increasing connection resistance under thermal and current cycling which indicates that EC wire would not be well suited for installations in the particular receptacles used where a stable contact resistance is necessary. It can also be seen that the improved wire exhibits a marked improvement over EC wire in that the connections are much more stable. Moreover, in some respects the improved wire even exceeds the performance level for copper wire in the particular connections tested. Numerous tests with other types of connections verify the marked superiority of the improved wire over EC wire and indicate that, while the improved wire cannot be relied upon to exceed the performance of copper wire in all installations it does compare very favorably with copper.

conductivity diminished in comparison to conductor produced according to the preferred practices although it nonetheless is quite satisfactory for many applications. In order to demonstrate the usefulness of conductor in the completely annealed condition the following examples 5 and 6, proceed.

EXAMPLE 5

Wire containing 0.37% Cu and 0.14% Mg, and, as impurities, 0.21% Fe and 0.05% Si, was prepared by cold drawing hot rolled redraw rod to produce severely strain hardened wire which was given a thermal treatment at a temperature of 600° F. for 90 minutes which is considered a complete annealing treatment. The wire was 14 gauge in thickness (0.080 inch diameter) and its properties are listed in Table V.

TABLE IV
[Resistance, percent ARL]

| | Wire size (ga.) | Initial level | Cumulative increase over initial level after cycling | | | | | | | | |
|---|---|---|---|---|---|---|---|---|---|---|---|
| | | | Oven cycles | | | In place | Cycles at 15 amps | | | Cycles at 20 amps | |
| | | | In place | 18 | 27 | | 100 | 250 | 500 | 25 | 100 |
| EC-H19 | 12 | 313 | 30 | 191 | 243 | 289 | 415 | 445 | 558 | 584 | 789 |
| EC-H24 | 12 | 268 | 63 | 327 | 372 | 574 | 451 | 1,051 | 1,620 | 2,406 | 12,901 |
| EC-H24 | 10 | 415 | 43 | 291 | 385 | 384 | 489 | 635 | 766 | 817 | 903 |
| Improved A | 12 | 306 | 25 | 77 | 148 | 160 | 136 | 213 | 276 | 322 | 241 |
| Improved B | 12 | 244 | 14 | 61 | 126 | 155 | 174 | 197 | 221 | 219 | 244 |
| Copper | 12 | 335 | 14 | 62 | 66 | 34 | 300 | 90 | 104 | 129 | 376 |
| Copper | 14 | 370 | −8 | 16 | 23 | 30 | 38 | 62 | 61 | 70 | 59 |

EXAMPLE 4

As another example comparing EC conductor with conductor in accordance with the preferred practice of the invention, multistranded cables made from 37 strands of 0.1162 inch diameter wire were tested to compare the performance of the improved wire with that of EC wire in a cable connection. The particular connector employed was a double-barreled set screw terminal connector rated at 400 amps. The connections were subjected to thermal cycling at 70° C. and current cycling at 640 and 800 amps. These tests demonstrated quite pointedly the superiority of the improved wire over EC wire, in both H19 and H24 tempers, in that the improved wire produced relatively small increases in resistance and temperature, whereas EC wire caused very large increases in resistance and temperature. At the conclusion of the tests the improved wire cable and the associated terminal connectors showed no sign of heat exposure or deterioration. The EC cables and their connectors were marked by obvious signs of heat and even by an actual burning of a connector set screw.

The foregoing tests and comparisons are based on the preferred practice of the invention which contemplates controlled fabrication procedures and the 400° to 500° thermal treatment to partially relax the severely strain hardened condition and partially precipitate the copper and magnesium to produce properties which are optimum for many applications. However, in a broader sense the invention also contemplates a more complete annealing treatment which sometimes offers cost and other advantages. Accordingly, the invention contemplates heating strain hardened conductor to temperatures of 500° to 750° F. for 15 to 500 minutes to substantially completely relax the strains and recrystallize the grain structure. Where this complete annealing treatment is contemplated, the temperatures maintained in working the ingot or starting material are less critical and need not be controlled in the manner described earlier in connection with the preferred fabrication practices. Also, the strain hardening, cold draw, aspect is less critical where the final conductor product is completely annealed. The resulting annealed conductor will have its strength decreased and to some extent its electrical

TABLE V

| T.S. ksi | Y.S. ksi | Elong. % in 10'' | El. Cond. % IACS | Number of Bends |
|---|---|---|---|---|
| 20 | 10.1 | 15.9 | 60.1 | 13 |

It is apparent from the table that the wire exhibits a lower strength level than wire discussed in the previous examples. Minimum properties are 17 ksi and 10 ksi for tensile and yield strength and 10 percent for elongation. However, in some types of conductor cable this yield strength level is adequate or can be augmented as by a non-metallic reinforcing strand such that the lower strength is not a great disadvantage. To further evaluate the usefulness of the improved wire in the annealed condition conductance tests of the type described in Example 3 were performed to compare this wire with EC wire in the extra hard (H19) temper which previous tests established to be the best temper for EC wire from the standpoint of contact stability in the connectors tested. The connector was the same as used in Example 3 and features provisions for both back wiring and side wiring arrangements. The tests were conducted in both types of wiring configurations and the results appear in Table VI where condition No. 1 refers to the side wired and Condition No. 2 refers to the back wired arrangement.

TABLE VI
[Resistance, percent ARL]

| | Initial level | Cumulative increase over initial level after cycling | | | | | |
|---|---|---|---|---|---|---|---|
| | | Oven cycles | | | In place | Cycles at 15 amps | |
| | | In place | 18 | 27 | | 25 | 100 |
| Condition No. 1: | | | | | | | |
| EC-H19 | 507 | 164 | 2,728 | 6,922 | 14,281 | 2,982 | 1,255 |
| Improved | 233 | 43 | 38 | 32 | 60 | 61 | 62 |
| Condition No. 2: | | | | | | | |
| EC-H19 | 433 | 109 | 452 | 542 | 626 | 480 | 727 |
| Improved | 280 | 33 | 109 | 114 | 152 | 176 | 175 |

It can be seen from Table VI that the improved conductor in the annealed condition continues to display vastly superior connection stability over EC conductor. In fact, comparing Tables IV and VI indicates that in this extremely critical aspect the improved conductor is not especially sensitive to fabrication or thermal treatment conditions which however can be utilized to improve other properties.

In multiple strand conductor of the type discussed in Example 4, especially in large diameter cables, the strength of the individual conductors can often be lower than in a single conductor. In fact, a lower strength is often desirable here to provide ease of bending which can otherwise become a problem in installing these cables, and the improved wire in the annealed condition is very well suited to these applications where its superior connection stability renders it quite comparable with copper. To illustrate, Table VII shows the results of oven and current cycle tests for EC multiple strand conductor cable in the H19 and H24 tempers and for the improved (annealed) conductor cable together with a copper conductor cable for comparison. Because of differences in conductivity, the size of the respective cables differed according to conductivity such that the cables are all approximately equal in current carrying capacity. The connection was of the split bolt type, Burndy KSU29 tin plated bronze, which is considered quite suitable for copper conductors but not for aluminum conductors.

TABLE VII
[Resistance, percent ARL]

| Conductor | Cable size, Kcmil | Initial level | Cumulative increase over initial level after cycling | | | | | | |
|---|---|---|---|---|---|---|---|---|---|
| | | | Oven cycles | | In place | Cycles at 432 amps | | | |
| | | | 18 | 17 | | 25 | 100 | 250 | 410 |
| EC-H19 | 250 | 268 | 836 | 1,060 | 1,073 | ¹ 22,428 | | | |
| EC-H24 | 250 | 458 | 306 | 402 | 351 | 1,653 | ¹ 10,646 | | |
| Improved | 257 | 128 | 36 | 64 | 89 | 53 | 63 | 85 | 110 |
| Copper | 156.65 | 74 | 7 | 13 | 23 | 41 | 42 | 58 | 49 |

¹ Failed melted strands.

From Table VII it is obvious that in a connector previously considered suitable for copper but not aluminum, the improved multistrand cable is not only vastly superior to EC but compares very favorably with copper cable. It is worth mentioning again that where the improved conductor product is completely annealed, the earlier fabrication control wherein an intermediate product is produced by working to an equivalent 15 to 30 percent cold reduction while maintaining temperatures to retain copper and magnesium in solution can be omitted as can the drastic cold reduction of at least 75 percent. These preferred steps, however, can be employed to improve the physical properties, for example, strength, of the improved conductor even where completely annealed. Regardless of the fabrication procedure, the improved conductor, even in the fully annealed condition, exhibits an electrical conductivity of at least 60 percent IACS although, as explained above, preferred practices result in still higher conductivity.

While the foregoing description has been directed primarily to wire which is the most common form of conductor, it is to be appreciated that the invention in a broader sense contemplates conductors where the cross section steps beyond the normal meaning of the term "wire" and accordingly the invention is intended to apply to all forms of electrical conductor products.

From all of the foregoing it becomes apparent that the invention provides an improved conductor which offers marked advantages over prior aluminum conductor and even approaches the performance level of copper and can be substituted for copper in many applications previously unsuited for aluminum conductor. That this substitution can be effected without extensive modification to existing connectors and other hardware permits aluminum's promise of very substantial cost and weight savings to be realized.

While the invention has been described in terms of particular embodiments, the claims appended hereto are intended to encompass all embodiments which fall within the spirit of the invention.

Having thus described my invention and certain embodiments thereof, I claim:

1. A method of producing improved electrical conductor wire comprising:
    1. providing a body of aluminum base alloy consisting essentially of 0.25 to 0.5 percent copper, 0.05 to 0.20 percent magnesium, the balance being essentially aluminum with the following maximum limits on impurities: 0.10% Si, 0.25% Fe, 0.04% B, 0.5% Ga, 0.05% Zn, 0.01% Sn, 0.01% Ni, 0.005% Mn, 0.005% Cr, 0.005% Ti, 0.005% V and 0.005% Zr,
    2. working said body into a rod suitable for drawing into wire, said working imparting to said rod an amount of strain hardening equivalent to that which would be derived from a cold reduction in cross sectional area of from 15 to 30 percent while maintaining working temperatures at levels which retain essentially all of the Cu and Mg in solid solution,
    3. cold working, by drawing, said rod to produce said wire in a severely strain hardened condition equivalent to that which would be imparted by a cold reduction of at least 75 percent in cross sectional area,
    4. heating said strain hardened wire to a temperature of from 400° to 500° F. for 15 to 500 minutes to effect a partial relaxation of said strain hardened condition and a partial precipitation of said copper and magnesium.

2. The method according to claim 1 wherein the aluminum alloy contains copper and magnesium in amounts such that Cu% + Mg% is at least 0.4 percent.

3. The improved wire produced by claim 1, said wire exhibiting a minimum electrical conductivity of 60 percent IACS and minimum tensile and yield strength levels of 20 ksi and 15 ksi, respectively, and a minimum elongation of 3 percent in 10 inches together with good bendability and with good compressive electrical connectability to facilitate high stability of electrical connection conductance.

4. An aluminum base alloy consisting essentially of 0.25 to 0.5 percent copper, 0.05 to 0.20 percent magnesium, the balance being essentially aluminum with the following maximum limits on impurities: 0.10% Si, 0.25% Fe, 0.04% B, 0.05% Ga, 0.05% Zn, 0.01% Sn, 0.01% Ni, 0.005% Mn, 0.005% Cr, 0.005% Ti, 0.005% V and 0.005% Zr, said alloy being capable of being fabricated into electrical conductor exhibiting a minimum electrical conductivity of 60 percent IACS, good strength and elongation, together with good bendability and good compressive electrical connectability.

5. A method of producing improved electrical conductor wire comprising:
    1. providing a body of aluminum base alloy consisting essentially of 0.25 to 0.5 percent copper, 0.05 to 0.20 percent magnesium, the balance being essentially aluminum with the following maximum limits on impurities: 0.10% Si, 0.25% Fe, 0.04% B, 0.05% Ga, 0.05% Zn, 0.01% Sn, 0.01% Ni, 0.005% Mn, 0.005% Cr, 0.005% Ti, 0.005% V and 0.005% Zr,
    2. shaping said body into an intermediate product suitable for cold working into the final conductor product, said working imparting to said intermediate product an amount of strain hardening equivalent to that which would be derived from cold reduction in cross sectional area from 15 to 30 percent while maintaining metal working temperatures at levels which retain essentially all the Cu and Mg in solid solution,
3. cold working said intermediate product to produce said conductor product in a severely strain hardened condition equivalent to that which would be imparted by a cold reduction of at least 75 percent in cross sectional area, and
4. heating said strain hardened conductor product to a temperature of from 400° to 750° F. for 15 to 500 minutes to effect at least some relaxation of said strain hardened condition and some precipitation of said Cu and Mg.

6. The method according to claim 5 wherein the strain hardened conductor product is heated at a temperature of from 500° to 750° F. to substantially completely relax said strain hardened condition.

7. An improved electrical conductor product composed of an alloy consisting essentially of 0.25 to 0.5 percent copper, 0.05 to 0.20 percent magnesium, the balance being essentially aluminum with the following maximum limits on impurities: 0.10% Si, 0.25% Fe, 0.04% B, 0.05% Ga, 0.05% Zn, 0.01% Sn, 0.01% Ni, 0.005% Mn, 0.005% Cr, 0.005% Ti, 0.005% V and 0.005% Zr, said conductor exhibiting an electrical conductivity of at least 60 percent IACS and good compressive electrical connectability and good strength and flexibility properties.

* * * * *

UNITED STATES PATENT OFFICE
CERTIFICATE OF CORRECTION

Patent No. 3,663,216  Dated May 16, 1972

Inventor(s) Harold Y. Hunsicker

It is certified that error appears in the above-identified patent and that said Letters Patent are hereby corrected as shown below:

| | |
|---|---|
| Abstract, line 6 | Change "is" to --in-- |
| Col. 1, line 65 | After "0.5" insert --percent-- |
| Col. 6, line 35 | Change "than" to --then-- |
| Table VII, under the heading "Oven Cycles" | Change "17" to --27-- |
| Col. 10, line 14 | Change "0.5" to --0.05-- |

Signed and sealed this 1st day of August 1972.

(SEAL)
Attest:

EDWARD M. FLETCHER, JR.　　　ROBERT GOTTSCHALK
Attesting Officer　　　　　　　Commissioner of Patents